UNITED STATES PATENT OFFICE.

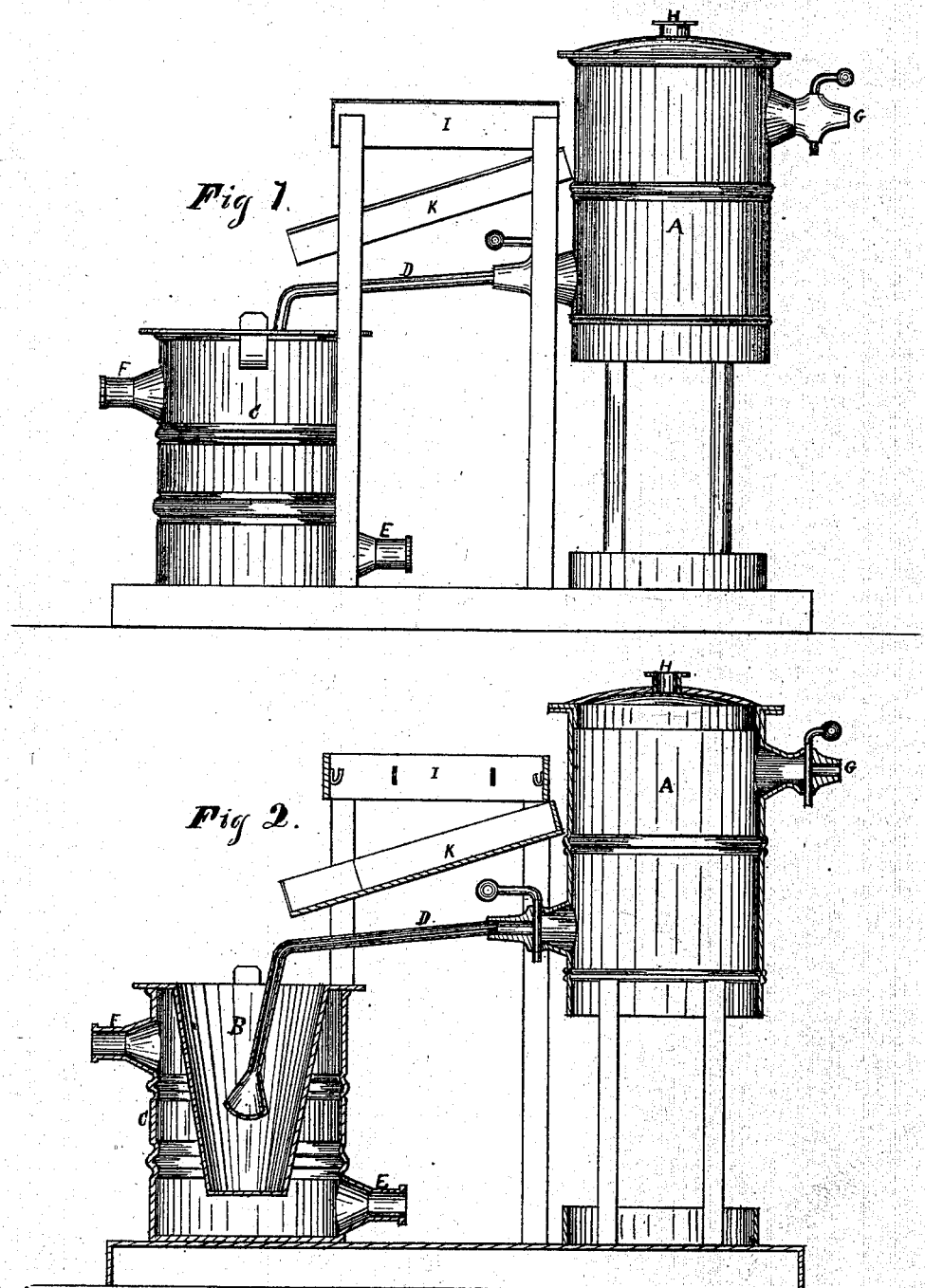

GEORGE W. KIRCHHÖFFER, OF CHICAGO, ILLINOIS.

IMPROVEMENT IN REFINING BUTTER.

Specification forming part of Letters Patent No. 139,796, dated June 10, 1873; application filed December 20, 1870.

*To all whom it may concern:*

Be it known that I, GEORGE W. KIRCHHÖFFER, of Chicago, in the county of Cook and the State of Illinois, have invented a new and useful Mode and Apparatus for the Purpose of Preserving and Improving Inferior Grades of Butter, of which the following is a specification:

My invention relates to the improvement of that class of butter which has been improperly handled—that is, which has either been worked too much, so as to make the butter tough and greasy in appearance, and although it is quite fresh and sweet cannot be sold as good butter; or it has been worked too little and too much milk remains, which causes it to spoil if it has to be kept for any length of time before being consumed, and it turns sour, bitter, and even rancid; or if the butter has been exposed to the influence of the atmosphere, and in this case is spoiled by the oxidizing power of the air. These kinds of butter can only be improved successfully by melting and by cleaning the same while in a liquid state, which, if done properly, renders the fat of the butter as neutral as it was when first made; but this process cannot be claimed as a new invention because it is done in many households for cooking purposes, and it is therefore superfluous to describe here any further a mode already so well known, although it constitutes an essential part of my process. But melted butter cooled in the ordinary way, and without the aid of extra means, loses its smoothness by the granulation of its crystallizable elements, so that it has a sandy unpleasant consistency to the taste, and although it may be perfectly sweet and well preserved, it is not merchantable butter. This crystallization can be prevented by suddenly cooling or congealing the melted butter; and my invention consists in the improved mode adopted for that purpose, and also in the construction and use of the apparatus, drawings of which accompany this specification.

Figure 1 is a vertical longitudinal or side elevation of my apparatus, and Fig. 2 is a vertical longitudinal section of the same.

A is the reservoir or receiver; B, the congealer; C, the cooler. D is a pipe leading from A to B, the lower end of which is perforated, and the other end is provided with a stop-cock at the connection with the reservoir A. E is the point to connect means to supply cold water to the cooler C. F is the point to allow the water to escape after it has rendered it service. G is a point to apply means to create pressure in the reservoir A. H represents a place or opening for filling the reservoir. I is a frame to hold a filter or strainer. K is a pan placed under the filter-frame and partly over the congealer B. The whole may be constructed of any suitable material, but wood and tinned metal are preferable for most parts.

The apparatus is used in the following manner: A quantity of butter, desirable to be improved and preserved, is melted and cleaned in the manner generally known, the resulting fatty substance, which in reality is the neutral fat, of which good butter only should consist, is placed in the reservoir A in a liquid state, and the reservoir closed air-tight. Care should be taken that the temperature in the butter is kept between 100° and 120° Fahrenheit. The congealer B is to be filled with milk or any other suitable liquid, but I prefer milk or buttermilk because either of them more nearly than any other liquid gives to the product the taste and sweetness of good butter. Water is made to flow through the cooler C to bring and keep the temperature in the liquid placed in the congealer between 55° and 65° Fahrenheit. It is very important to observe these points of temperature correctly to secure uniformity and smoothness as the result. It is therefore advisable to place thermometers in the respective vessels for the better observation of these temperatures. Pressure is now applied at the point G to the surface of the liquid butter in the reservoir by any known and suitable means affixed thereto for that purpose; the amount of pressure necessary depends somewhat on the quantity of liquid in the congealer, and therefore must be provided accordingly. The stop-cock of the pipe D is now to be opened, and the liquid butter is forced by the pressure in A through the pipe D and its perforations, in a very minutely divided state, into the cold liquid in the congealer, and thereby cooled or congealed expeditiously and thoroughly. The congealed particles of butter will rise to the surface of the liquid in the congealer, where it is collected and thrown on the filter or strainer placed on the frame I to allow the adhering liquid to drain and flow back to the congealer by means of the pan K. When sufficiently drained the butter is taken from the filter and handled or treated precisely in the same way and with the same care as good dairymen do their butter when it comes from the churn. It is worked to free it of the remaining liquid used in congealing, salted and packed in the usual manner, and if it has been properly handled, is good butter.

If butter of inferior grade is designated to be preserved for future consumption, it is to be cleaned, in the aforesaid usual manner, of its impurities and decomposing qualities; and, without passing the same through the congealing process, it may be placed in suitable vessels where it is excluded from the influence of the air as much as possible, and stored away in a cool place. Butter preserved in this form will keep fresh and neutral a much longer time than if packed and stored away in its original impure state. When the time arrives that it is desirable to have this butter ready for consumption, it is taken out, melted, and made to pass through the congealing process in the manner above described, and it becomes good merchantable butter.

Having fully described my invention, I claim—

1. The herein-described process of suddenly cooling or congealing melted butter, which has been cleaned by injecting the same into a vessel containing milk, buttermilk, or other suitable liquid, substantially as and for the purpose specified.

2. The apparatus, consisting of the reservoir A, congealer B, cooler C, pipe D with stop-cock and perforated end, supply-pipe E, outlet F, pressure-inlet G, filter-frame I, and pan K, substantially as and for the purpose described.

GEORGE W. KIRCHHÖFFER.

Witnesses:
N. C. GRIDLEY,
G. H. FROST.